US010981565B2

(12) United States Patent
Abinger et al.

(10) Patent No.: US 10,981,565 B2
(45) Date of Patent: Apr. 20, 2021

(54) METHOD, SYSTEM, AND VEHICLE COMPRISING THE SYSTEM FOR AUTOMATIC INITIATION OF A VEHICLE FUNCTION OF A VEHICLE

(71) Applicant: Bayerische Motoren Werke Aktiengesellschaft, Munich (DE)

(72) Inventors: Gabriele Abinger, Unterschleissheim (DE); Stefan Heinbockel, Munich (DE); Thomas Klattig, Peissenberg (DE); Ralf Wistorf, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 242 days.

(21) Appl. No.: 16/157,804

(22) Filed: Oct. 11, 2018

(65) Prior Publication Data

US 2019/0061746 A1  Feb. 28, 2019

Related U.S. Application Data

(63) Continuation of application No. PCT/EP2017/051742, filed on Jan. 27, 2017.

(30) Foreign Application Priority Data

Apr. 12, 2016  (DE) .................. 10 2016 206 067.8

(51) Int. Cl.
*B60R 25/01* (2013.01)
*B60W 30/09* (2012.01)
(Continued)

(52) U.S. Cl.
CPC ............. *B60W 30/09* (2013.01); *B60R 25/24* (2013.01); *B60W 30/0956* (2013.01);
(Continued)

(58) Field of Classification Search
CPC ..... B60R 25/24; B60R 25/01; B60R 25/2054; B60R 25/31; G01S 7/003; G06N 3/08;
(Continued)

(56) References Cited

U.S. PATENT DOCUMENTS 6,700,475 B1    3/2004  Geber et al.
6,965,296 B2 *  11/2005  Kamlah .................. B60R 25/00
                                                                340/10.41
(Continued)

FOREIGN PATENT DOCUMENTS

DE     199 12 319 C1    10/2000
DE     103 61 115 A1     7/2005
(Continued)

OTHER PUBLICATIONS

PCT/EP2017/051742, International Search Report dated Apr. 28, 2017 (Three (3) pages).
(Continued)

*Primary Examiner* — Dalena Tran
(74) *Attorney, Agent, or Firm* — Crowell & Moring LLP

(57) ABSTRACT

A method for automatic initiation of a vehicle function of a vehicle includes ascertaining a first location of an object at a first time in a surrounding area of the vehicle, and ascertaining a second location of the object at a second time in the surrounding area of the vehicle. The method also includes calculating a movement vector depending on the ascertained first location of the object at the first time and the ascertained second location of the object at the second time, determining a point of intersection between the movement vector and a virtual vehicle region, wherein the virtual vehicle region corresponds at least in part to a real vehicle region of the vehicle, and initiating a vehicle function of the vehicle in response to a point of intersection between the movement vector and a virtual vehicle region being present.

17 Claims, 2 Drawing Sheets

(51) Int. Cl.
| | |
|---|---|
| *E05F 15/76* | (2015.01) |
| *B60R 25/24* | (2013.01) |
| *E05F 15/77* | (2015.01) |
| *G07C 9/00* | (2020.01) |
| *B60W 30/095* | (2012.01) |
| *G05D 1/00* | (2006.01) |
| *G06K 9/00* | (2006.01) |
| *G06T 7/20* | (2017.01) |

(52) U.S. Cl.
CPC .............. *E05F 15/76* (2015.01); *E05F 15/77* (2015.01); *G05D 1/0088* (2013.01); *G06K 9/00805* (2013.01); *G06T 7/20* (2013.01); *G07C 9/00309* (2013.01); *E05Y 2900/50* (2013.01); *G05D 2201/0213* (2013.01); *G06T 2207/30261* (2013.01); *G07C 2009/00769* (2013.01); *G07C 2009/00793* (2013.01); *G07C 2209/63* (2013.01)

(58) Field of Classification Search
CPC .. G06N 3/04; G07C 9/00309; G07C 2209/64; G06K 9/00805; B60W 30/09; B60W 30/0956
USPC ................................................ 701/301, 2, 49
See application file for complete search history.

(56) References Cited

U.S. PATENT DOCUMENTS

| | | | |
|---|---|---|---|
| 2006/0224290 A1* | 10/2006 | Nakashima | ............. B60R 25/24 701/49 |
| 2007/0162191 A1 | 7/2007 | Matsubara et al. | |
| 2011/0218709 A1* | 9/2011 | Hermann | ................ B60R 25/24 701/45 |
| 2016/0001742 A1* | 1/2016 | Miyazawa | ......... G07C 9/00309 701/2 |

FOREIGN PATENT DOCUMENTS

| | | |
|---|---|---|
| DE | 10 2006 037 237 A1 | 2/2008 |
| DE | 10 2010 010 057 A1 | 9/2011 |
| DE | 10 2014 018 057 A1 | 6/2016 |
| EP | 2 657 092 A1 | 10/2013 |
| EP | 2 962 910 A1 | 1/2016 |
| WO | WO 2013/072489 A1 | 5/2013 |
| WO | WO 2014/086763 A1 | 6/2014 |

OTHER PUBLICATIONS

German Search Report issued in German counterpart application No. 10 2016 206 067.8 dated Dec. 9, 2016, with Statement of Relevancy (Nine (9) pages).
Chinese Office Action issued in Chinese application No. 201780006780.2 dated Nov. 4, 2020 (Six (6) pages).

* cited by examiner

METHOD, SYSTEM, AND VEHICLE COMPRISING THE SYSTEM FOR AUTOMATIC INITIATION OF A VEHICLE FUNCTION OF A VEHICLE

CROSS REFERENCE TO RELATED APPLICATIONS

This application is a continuation of PCT International Application No. PCT/EP2017/051742, filed Jan. 27, 2017, which claims priority under 35 U.S.C. § 119 from German Patent Application No. 10 2016 206 067.8, filed Apr. 12, 2016, the entire disclosures of which are herein expressly incorporated by reference.

BACKGROUND AND SUMMARY OF THE INVENTION

The invention relates to a method for automatic initiation of a vehicle function of a vehicle, and a system for automatic initiation of the vehicle function of the vehicle and a vehicle comprising the system.

Vehicles may contain an automatic system with which a vehicle can be unlocked or locked without an active use of a vehicle key. If a vehicle user approaches the vehicle with a vehicle key, the vehicle can be unlocked automatically. If a vehicle user moves away from the vehicle with the vehicle key, the vehicle can be locked automatically. However, known systems also unlock or lock the vehicle when a vehicle user runs past the vehicle, without wishing to use the vehicle.

It is therefore an object of the invention to improve an automatic initiation of vehicle functions. In particular, it is an object of the invention to efficiently reduce a number of automatically initiated vehicle functions.

According to one aspect, the invention is distinguished by a method for automatic initiation of a vehicle function of a vehicle. The method comprises ascertaining a first location of an object at a first time in a surrounding area of a vehicle, ascertaining a second location of the object at a second time in the surrounding area of the vehicle and calculating a movement vector depending on the ascertained first location of the object at the first time and the ascertained second location of the object at the second time. An object can be a vehicle key, a smart device, for example a smartphone, a smart watch, a smartcard, or augmented reality glasses, and/or a wireless communications device, which is able to communicate with a wireless interface of a vehicle. A vehicle function may comprise opening and/or closing of a vehicle access, for example a vehicle door, a tailgate, a front opening, a tank cap, an engine hood, and/or a window of the vehicle, an initiation of one or more visual signals, audio signals, and/or audiovisual signals of the vehicle. By way of example, lights and/or strip lights of the vehicle can be activated or deactivated and/or change their intensity and/or color. By way of example, display devices in the interior and/or on the exterior of the vehicle can display information, in particular changing information. The method further comprises determining a point of intersection between the movement vector and a virtual vehicle region, wherein the virtual vehicle region corresponds at least in part to a real vehicle region of the vehicle. Preferably, the virtual vehicle region is rectangular and comprises the real vehicle region in its entirety. By way of example, the virtual vehicle region can be identical to the external dimensions of the vehicle. By way of example, the virtual vehicle region can map contours of the vehicle. The real vehicle region can comprise a length and a width of the vehicle. The real vehicle region can correspond to a real dimension of the vehicle. If a point of intersection between the movement vector and a virtual vehicle region is present or if it was possible to determine a point of intersection between the movement vector and a virtual vehicle region, the method comprises initiating a vehicle function of the vehicle. By way of example, initiation of the vehicle function can be initiated by a control device of the vehicle which carries out an appropriate vehicle function after an identification and/or authentication of the object, for example.

Advantageously, it is possible to better identify an intent of a user of the vehicle, be it approaching the vehicle or walking past the vehicle, and so it is possible to avoid an unnecessary initiation of vehicle functions. As a result, the security of a vehicle access can be improved, for example by virtue of a vehicle function such as the unlocking of a vehicle door only being initiated if there is the user of the vehicle, who is carrying the object, moving toward the vehicle, i.e. the movement vector forms a point of intersection with the virtual or real vehicle region. By avoiding the initiation or implementation of vehicle functions, it is further possible to save power that is linked to the initiation of the vehicle function. Consequently, the power of the object and of the vehicle can be used more efficiency, which can be reflected in a longer duration of use of the object and/or of the vehicle without a renewed power supply, for example. Further, it is possible to trigger vehicle functions proactively such that possible delays within the scope of initiating vehicle functions are avoided.

According to an advantageous configuration, the vehicle function can be initiated by the object and/or depending on a position of the point of intersection with the virtual vehicle region. In this way, a vehicle function can be determined efficiently by an object and/or by the point of intersection.

According to a further, advantageous configuration, the first location of the object and/or the second location of the vehicle can be ascertained relative to a position of the vehicle and/or the first location of the object and/or the second location of the object can be ascertained relative to the virtual vehicle region of the vehicle. In this way, the location or the position of the object can be determined flexibly in relation to the position of the vehicle.

According to a further, advantageous configuration, the vehicle function can be initiated depending on the first location of the object and/or depending on the second location of the object. In this way, a vehicle function can be determined and initiated flexibly on the basis of the location and/or on the basis of the movement between the locations.

According to a further, advantageous configuration, ascertaining the first location of the object and/or the second location of the object in the surrounding area of the vehicle can comprise: transmitting a query radio signal to the object and, if the object is in the surrounding area of the vehicle, receiving a response radio signal of the object, ascertaining a feature vector depending on the response radio signal, wherein the feature vector comprises at least one physical property of the response radio signal and/or of the query radio signal, determining one or more feature vectors from a set of predetermined, unique feature vectors depending on the ascertained feature vector, wherein a feature vector from the set of predetermined feature vectors is linked to a unique location in a predetermined grid in the surrounding area of the vehicle, and setting a location of the object as the location that is linked to the determined feature vector. In this way, the location of the object can be ascertained efficiently.

By way of example, the query radio signal and/or the response radio signal can be signals of a key search by the vehicle. By way of example, the signals can be standardized in order to facilitate a broad field of application. By way of example, the query radio signal and/or the response radio signal can be signals from a near field communication interface, e.g. near field communication NFC, Bluetooth and/or Bluetooth low energy.

The feature vector can contain physical properties of the query radio signal and/or of the response radio signal. Furthermore, the feature vector can comprise a unique identification of the object and/or of the vehicle. The predetermined feature vectors can be determined during a calibration of the vehicle and can be stored in a control device of the vehicle. The predetermined feature vectors can be ascertained on the basis of a grid. A feature vector can be ascertained for each point of the grid. The grid can be arranged in a coordinate system. Consequently, a unique location or a unique position in the coordinate system can be specified for each point of the grid. The origin of the coordinate system can be determined relatively, for example depending on a range of the radio signals of the vehicle.

According to a further, advantageous configuration, the method, if a feature vector from the set of the predetermined, unique feature vectors corresponds to the ascertained feature vector, can furthermore comprise setting the location of the object as the location that is linked to the determined feature vector. And/or, the method, if a feature vector from the set of the predetermined, unique feature vectors does not correspond to the ascertained feature vector, can furthermore comprise determining at least two feature vectors from the set of the feature vectors whose features are the most similar to the features of the ascertained feature vector and setting the location of the object as a line segment lying between the locations that are linked to the at least two determined feature vectors. In this way, a location in the grid can be efficiently assigned to an ascertained feature vector. The location in the grid can be a unique position if the ascertained feature vector is identical, or virtually identical, to a predetermined feature vector or it can be a line segment between two locations in the grid if the ascertained feature vector does not correspond to any predetermined feature vector but instead lies between two predetermined feature vectors of the grid.

According to a further, advantageous configuration, the movement vector can be calculated should the first location and the second location of the object differ. In this way, it is possible to reduce the computational resources required for determining the movement vector since a movement vector is only calculated if a movement is present, i.e., if the first location and the second location of the object differ. No movement vector is calculated if the user of the vehicle or the carrier of the object stops in the surrounding area of the vehicle and moves no further. Consequently, the efficiency of the calculation of the movement vector can be improved.

According to a further, advantageous configuration, the method, if a point of intersection between the movement vector and a virtual vehicle region is present, can furthermore comprise determining a distance between the second location of the object and the virtual vehicle region and, if the distance drops below a first predetermined threshold value, initiating a first vehicle function. In this way, vehicle functions can be initiated flexibly depending on the distance of the object.

According to a further, advantageous configuration, the method, if the distance drops below a second predetermined threshold value, can furthermore comprise initiating a second vehicle function. In this way, vehicle functions can be initiated flexibly depending on the distance of the object.

According to a further, advantageous configuration, the method, if no point of intersection is present or if no point of intersection can be determined, can furthermore comprise suppressing an initiation of a vehicle function, wherein the vehicle function is preferably a first and/or a second vehicle function. In this way, the initiation of vehicle functions can be efficiently improved. A vehicle function is initiated only if the user of the vehicle or the carrier of the object approaches the vehicle, i.e. only if a point of intersection is present. Otherwise, i.e. if no point of intersection is present, the vehicle assumes the user of the vehicle or the carrier of the object is walking past the vehicle and said vehicle suppresses the initiation of one or more vehicle functions.

According to a further, advantageous configuration, the method, if no point of intersection is present and a first and/or a second vehicle function is initiated, can furthermore comprise deactivating the first and/or the second initiated vehicle function and suppressing an initiation of a further vehicle function. In this way, the security of the vehicle can be efficiently increased by virtue of the vehicle deactivating the already activated or initiated vehicle functions and the vehicle preventing the initiation of further vehicle functions should the vehicle recognize that the user of the vehicle or the carrier of the object is walking past the vehicle and/or moving away from the vehicle again. Furthermore, the number of initiated vehicle functions, and consequently the energy consumption for the vehicle functions, can be efficiently reduced.

According to a further, advantageous configuration, the method can furthermore comprise determining a distance between the second location of the object and the virtual vehicle region and, if the distance drops below a third predetermined threshold value, wherein the third predetermined threshold value is less than the first and the second predetermined threshold value, and no point of intersection is present, initiating the second vehicle function. In this way, a vehicle function can be initiated even without a point of intersection being present should the distance between the user of the vehicle or the carrier of the object and the vehicle be very small, for example in the region of a few centimeters. If the user of the vehicle moves e.g. parallel to the vehicle in constricted surroundings, e.g. in a parking block, parking lot or parking garage, and hence no point of intersection of the movement vector with the virtual vehicle region can be determined, the vehicle function can nevertheless be initiated. Consequently, the functional reliability of the method can be increased.

According to a further, advantageous configuration, the first vehicle function can comprise a visual and/or audiovisual control of components of the vehicle and/or the second vehicle function can comprise an unlocking of a vehicle access. In this way, it is possible to flexibly combine various vehicle functions with one another. By way of example, vehicle functions with light effects and the unlocking of the vehicle can be controlled differently.

According to a further aspect, the invention is distinguished by a system for automatic initiation of vehicle functions of a vehicle, wherein the system is configured to carry out the above-described method.

According to a further aspect, the invention is distinguished by a vehicle comprising the system for automatic initiation of vehicle functions of a vehicle, wherein the system is configured to carry out the above-described method.

Further features of the invention emerge from the claims, the figures and the description of the figures. All features and feature combinations specified in the description above and all features and feature combinations specified in the description of the figures and/or only shown in the figures below can be used not only in the respectively specified combination, but also in other combinations or else on their own.

A preferred exemplary embodiment of the invention is described below on the basis of the attached drawings. From this, further details, preferred configurations and developments of the invention arise. In detail:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
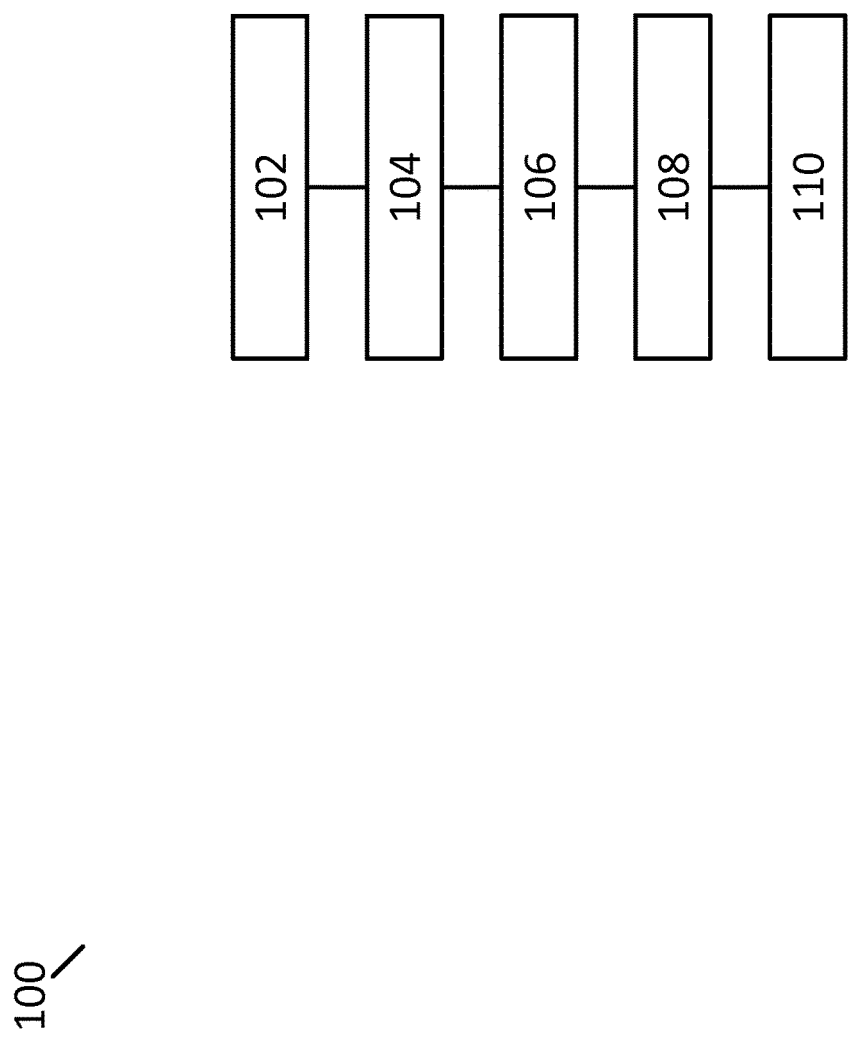
FIG. 1 schematically shows an exemplary flowchart of a method for automatic initiation of a vehicle function.

In detail, FIG. 1 shows an exemplary flowchart of a method 100 for automatic initiation of one or more vehicle functions of a vehicle, in particular when an object approaches the vehicle. The automatic initiation can comprise an activation or deactivation of a vehicle function. The vehicle functions may comprise unlocking and/or locking of a vehicle access, for example one or more vehicle doors, a trunk, a tank cap, an engine hood and/or a sliding/panoramic roof, and a visual or audiovisual lighting event of the vehicle. For the purposes of the lighting event, a control device can transmit one or more control commands to light and/or audio components of the vehicle in order to activate or deactivate the corresponding lighting event. The object can be a vehicle key and/or a smart device. A smart device can be a smartphone, a smart card, a smart watch, smart-glasses and/or smart apparel.

A zone or region in a surrounding area of the vehicle, also referred to as vehicle region below, can be subdivided into a grid. The grid can be regular and/or be aligned on the basis of a coordinate system. Individual points of the grid can be uniquely addressed by way of coordinates of the coordinate system. A point of the grid can be specified to a unique location relative to an origin of the coordinate system and/or relative to a position of the vehicle. The grid can directly or indirectly adjoin a virtual vehicle region of the vehicle.

The method 100 for initiation of a vehicle function of a vehicle can determine a first location of an object at a first time in the surrounding area of the vehicle 102. By way of example, in order to determine the location of the object, the vehicle can identify the object in the surrounding area with the aid of a key search and can determine the location of the object by means of the grid. In a manner analogous thereto, the method can determine a second location of the object at a second time in the surrounding area of the vehicle 104. A movement vector can be calculated by determining a first location and a second location of the object at different times 106. The movement vector can indicate a movement direction of the object or of the carrier of the object. More than two ascertained locations of the object, e.g. 3, 4, 5, 6, etc., can be used for calculating the movement vector.

For a calculated movement vector, the method 100 can determine a point of intersection between the movement vector and a virtual vehicle region 108, provided a point of intersection is present. The virtual vehicle region corresponds at least in part to a real vehicle region, which may be set by the external dimensions of the vehicle. Preferably, the virtual vehicle region has a rectangular form. Preferably, the virtual vehicle region adjoins the grid in the surrounding area of the vehicle. The rectangular form of the virtual vehicle region can simplify the calculation of a point of intersection. A vehicle function of the vehicle can be initiated if a point of intersection is present between the movement vector and the virtual vehicle region 110. Expressed differently, should a point of intersection have been determined between the movement vector and the virtual vehicle region, the method assumes that the user of the vehicle or the carrier of the object intends to use the vehicle. Accordingly, the vehicle can initiate one or more associated vehicle functions 110.

Figure 2:
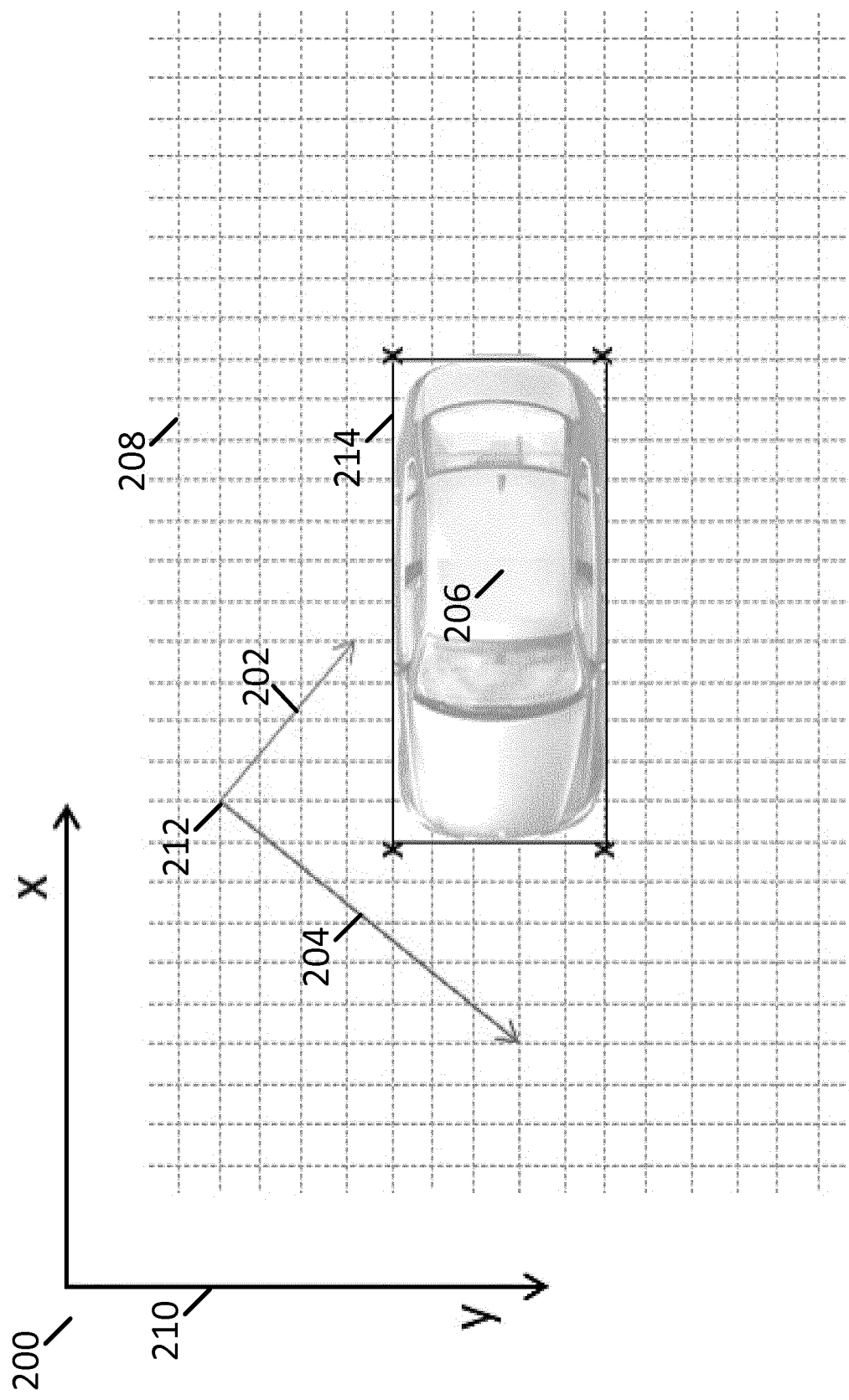
FIG. 2 schematically shows an exemplary scenario for an automatic initiation and non-initiation of a vehicle function of a vehicle.

In detail, FIG. 2 shows an exemplary scenario 200 for an automatic initiation and a non-initiation of a vehicle function of a vehicle depending on a respective movement vector 202, 204. As imaged in FIG. 2, a zone around the vehicle 206 can be subdivided into a grid 208, which can be aligned on the basis of a coordinate system 210, for example. A unique feature vector can be defined for each point of the grid 208 within the coordinate system 210. The vehicle 206 can ascertain a location 212 of the object, e.g. a vehicle key, within the grid. By way of example, a polling of low-frequency antennas of the vehicle 206 can be used to ascertain the location 212 of the object. The polling can be carried out continuously in order to be able to track a movement direction of the object 212. A movement vector 202, 204 can be calculated on the basis of the ascertained locations 212 of the object within the grid 208, said movement vector representing the accurate movement direction of the object 212. By means of the movement vector 202, 204, it is possible to determine whether the user of the vehicle or the carrier of the object in fact approaches the vehicle 206, as indicated by the movement vector 202, for example, or only runs past the vehicle 206, as represented by the movement vector 204, for example.

In FIG. 2, the real vehicle region of the vehicle 206 is presented in abstracted form by a virtual vehicle region 214. By way of example, the virtual vehicle region 214 can have a rectangular form and completely surround the real vehicle region. Here, the corners of the virtual vehicle region are end points of line segments that connect the respective corners. An approach of the object to the vehicle can be present when the calculated movement vector, e.g. movement vector 202, intersects the line segments connecting the corners of the virtual vehicle region. The vehicle can use the ascertained point of intersection in order to initiate a vehicle function.

Advantageously, the vehicle only carries out a vehicle function if the movement vector indicates that the user of the vehicle approaches the vehicle and not only runs past the latter. Consequently, it is possible to efficiently prevent unwanted vehicle functions and the energy consumption for the initiation or implementation of vehicle functions can be efficiently reduced. Furthermore, it is possible to recognize more accurately the point on the vehicle at which the user of the vehicle is expected to arrive. By way of example, it is possible to identify that the user of the vehicle approaches the driver door or the rear door on the driver side by determining the point of intersection. The vehicle can carry out different vehicle functions depending on the door at which the user will arrive. Consequently, the vehicle can react individually and more precisely to the approach of the user of the vehicle. Furthermore, this can increase the security of the vehicle as only vehicle functions that are individually tailored to the movement of the user are carried out. By way of example, this can consequently prevent unnecessary unlocking of further doors of the vehicle, which could facilitate the entry of further persons.

LIST OF REFERENCE SIGNS

100 Method
102 Ascertaining a first location of an object
104 Ascertaining a second location of the object
106 Calculating a movement vector
108 Determining a point of intersection
110 Initiating a vehicle function
200 Scenario
202 Movement vector
204 Movement vector
206 Vehicle
208 Grid
210 Coordinate system
212 Location of the object
214 Virtual vehicle region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatic initiation of a vehicle function of a vehicle, the method comprising the acts of:
   ascertaining a first location of an object at a first time in a surrounding area of the vehicle;
   ascertaining a second location of the object at a second time in the surrounding area of the vehicle;
   calculating a movement vector depending on the ascertained first location of the object at the first time and the ascertained second location of the object at the second time;
   determining a point of intersection between the movement vector and a virtual vehicle region, wherein the virtual vehicle region is rectangular and completely surrounds a real vehicle region of the vehicle; and
   initiating a vehicle function of the vehicle in response to a point of intersection between the movement vector and the virtual vehicle region being present.

2. The method as claimed in claim 1, wherein the vehicle function is initiated at least one of (i) by the object, and (ii) depending on a position of the point of intersection with the virtual vehicle region.

3. The method as claimed in claim 1, wherein at least one of the first location of the object and the second location of the object are ascertained relative to at least one of a position of the vehicle and the virtual vehicle region of the vehicle.

4. The method as claimed in claim 1, wherein the vehicle function is initiated depending on at least one of the first location of the object and the second location of the object.

5. The method as claimed in claim 1, wherein ascertaining at least one of the first location of the object and the second location of the object in the surrounding area of the vehicle comprises:
   transmitting a query radio signal to the object;
   receiving a response radio signal of the object if the object is in the surrounding area of the vehicle;
   ascertaining a feature vector depending on the response radio signal, wherein the feature vector comprises at least one physical property of the response radio signal and/or of the query radio signal;
   determining one or more feature vectors from a set of predetermined, unique feature vectors depending on the ascertained feature vector, wherein a feature vector from the set of predetermined feature vectors is linked to a unique location in a predetermined grid in the surrounding area of the vehicle; and
   setting a location of the object as the location that is linked to the determined feature vector.

6. The method as claimed in claim 5, wherein if a feature vector from the set of the predetermined, unique feature vectors corresponds to the ascertained feature vector the method further comprises setting the location of the object as the location that is linked to the determined feature vector.

7. The method as claimed in claim 6, wherein if a feature vector from the set of the predetermined, unique feature vectors does not correspond to the ascertained feature vector, the method further comprises:
   determining at least two feature vectors from the set of the feature vectors whose features are the most similar to the features of the ascertained feature vector; and
   setting the location of the object as a line segment lying between the locations that are linked to the at least two determined feature vectors.

8. The method as claimed in claim 5, wherein if a feature vector from the set of the predetermined, unique feature vectors does not correspond to the ascertained feature vector, the method further comprises:
   determining at least two feature vectors from the set of the feature vectors whose features are the most similar to the features of the ascertained feature vector; and
   setting the location of the object as a line segment lying between the locations that are linked to the at least two determined feature vectors.

9. The method as claimed in claim 1, wherein the movement vector is calculated in response to the first location and the second location of the object differing.

10. The method as claimed in claim 1, wherein the method further comprises:
    determining a distance between the second location of the object and the virtual vehicle region if a point of intersection between the movement vector and a virtual vehicle region is present; and
    initiating a first vehicle function if the distance drops below a first predetermined threshold value.

11. The method as claimed in claim 10, the method further comprises initiating a second vehicle function if the distance drops below a second predetermined threshold value.

12. The method as claimed in claim 1, the method further comprises suppressing an initiation of a vehicle function if no point of intersection is present,
    wherein the vehicle function is preferably a first and/or a second vehicle function.

13. The method as claimed in claim 1, wherein if no point of intersection is present and at least one of a first and a second vehicle function is initiated, the method further comprises:
    deactivating the at least one of the first and the second initiated vehicle function; and
    suppressing an initiation of a further vehicle function.

14. The method as claimed in claim 1, wherein the method further comprises:

determining a distance between the second location of the object and the virtual vehicle region; and initiating the second vehicle function if the distance drops below a third predetermined threshold value, wherein the third predetermined threshold value is less than the first and the second predetermined threshold value, and no point of intersection is present.

15. The method as claimed in claim 1, wherein the first vehicle function comprises at least one of a visual and audiovisual control of components of the vehicle, and wherein the second vehicle function comprises an unlocking of a vehicle access.

16. A system for automatic initiation of vehicle functions of a vehicle, wherein the system is configured to ascertain a first location of an object at a first time in a surrounding area of the vehicle;

ascertain a second location of the object at a second time in the surrounding area of the vehicle;

calculate a movement vector depending on the ascertained first location of the object at the first time and the ascertained second location of the object at the second time;

determine a point of intersection between the movement vector and a virtual vehicle region, wherein the virtual vehicle region is rectangular and completely surrounds a real vehicle region of the vehicle; and initiate a vehicle function of the vehicle in response to a point of intersection between the movement vector and a virtual vehicle region being present.

17. A vehicle comprising a system for automatic initiation of vehicle functions of a vehicle, wherein the system is configured to:

ascertain a first location of an object at a first time in a surrounding area of the vehicle;

ascertain a second location of the object at a second time in the surrounding area of the vehicle;

calculate a movement vector depending on the ascertained first location of the object at the first time and the ascertained second location of the object at the second time;

determine a point of intersection between the movement vector and a virtual vehicle region, wherein the virtual vehicle region is rectangular and completely surrounds a real vehicle region of the vehicle; and initiate a vehicle function of the vehicle in response to a point of intersection between the movement vector and a virtual vehicle region being present.

* * * * *